(12) United States Patent
Huang et al.

(10) Patent No.: US 9,112,573 B2
(45) Date of Patent: Aug. 18, 2015

(54) METHOD AND APPARATUS FOR CODING A SIGNAL IN A RELAY NETWORK

(71) Applicant: Kabushiki Kaisha Toshiba, Tokyo (JP)

(72) Inventors: Gillian Huang, Bristol (GB); Yue Wang, Bristol (GB); Justin Coon, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 206 days.

(21) Appl. No.: 13/874,580

(22) Filed: May 1, 2013

(65) Prior Publication Data

US 2013/0294329 A1  Nov. 7, 2013

(30) Foreign Application Priority Data

May 3, 2012 (GB) .................................. 1207806.9

(51) Int. Cl.
| | |
|---|---|
| *H04B 7/26* | (2006.01) |
| *H04W 88/04* | (2009.01) |
| *H04W 80/04* | (2009.01) |
| *H04W 88/06* | (2009.01) |
| *H04W 28/04* | (2009.01) |
| *H04W 72/04* | (2009.01) |
| *H04B 7/15* | (2006.01) |
| *H04L 1/06* | (2006.01) |
| *H04L 1/00* | (2006.01) |
| *H04B 7/02* | (2006.01) |
| *H04B 7/06* | (2006.01) |

(52) U.S. Cl.
CPC .................. *H04B 7/15* (2013.01); *H04B 7/026* (2013.01); *H04B 7/0669* (2013.01); *H04L 1/0077* (2013.01); *H04L 1/0643* (2013.01); *H04L 1/0662* (2013.01); *H04L 1/0668* (2013.01); *H04B 7/0671* (2013.01); *H04B 7/2606* (2013.01); *H04L 2001/0097* (2013.01)

(58) Field of Classification Search
CPC .... H04B 7/2606; H04W 88/04; H04W 80/04; H04W 88/06; H04W 28/04; H04W 72/04
USPC .......................................... 370/315, 328, 329
See application file for complete search history.

(56) References Cited

U.S. PATENT DOCUMENTS

2010/0296433 A1* 11/2010 No et al. ....................... 370/315

FOREIGN PATENT DOCUMENTS

| JP | 2009-49937 A | 3/2009 |
|---|---|---|
| JP | 2009-523361 A | 6/2009 |
| JP | 2011-510519 A | 3/2011 |
| JP | 2011-91501 A | 5/2011 |

OTHER PUBLICATIONS

Office Action issued on Jun. 3, 2014 in the corresponding Japanese Patent Application No. 2013-096695 (with English Translation).

(Continued)

*Primary Examiner* — Ronald B Abelson
(74) *Attorney, Agent, or Firm* — Oblon, McClelland, Maier & Neustadt, L.L.P.

(57) ABSTRACT

A heterogeneous arrangement of encoder and precoder are provided in a multi-hop communications network. The net effect of the encoder and precoder is to present, to a destination node, a quasi-orthogonal space time block coded transmission.

18 Claims, 6 Drawing Sheets

(56) References Cited

OTHER PUBLICATIONS

Japanese Office Action issued Sep. 2, 2014 in Patent Application No. 2013-096695 (with English Translation).
Behrouz Maham, et al., "Quasi-Orthogonal Design and Performance Analysis of Amplify-and-Forward Relay Networks with Multiple-Antennas", Proceedings of the 2010 IEEE Wireless Communications and Networking Conference (WCNC 2010), Apr. 18, 2010, 6 pages.
Jin-Hyuk Song, et al., "Space-Time Cyclic Delay Diversity Encoded Cooperative Transmissions for Multiple Relays", IEICE Transactions on Communications, vol. E92-B, No. 6, Jun. 2009, 4 pages.
United Kingdom Search Report Issued Sep. 11, 2012, in Great Britain Patent Application No. 1207806.9, filed May 3, 2012.

* cited by examiner

METHOD AND APPARATUS FOR CODING A SIGNAL IN A RELAY NETWORK

CROSS REFERENCE TO RELATED APPLICATION

This application is based upon and claims the benefit of priority from United Kingdom Patent application no. GB1207806.9 filed 3 May 2012; the entire contents of which are incorporated herein by reference.

FIELD

Embodiments described herein relate to relaying of MIMO communications, and particularly to the coding of signals within such communications.

BACKGROUND

MIMO (multiple input, multiple output) communications has been in development for some considerable time. However, these have generally been arranged on a point-to-point basis, i.e. with a source MIMO node communicating directly with a destination MIMO node. While this communication technology is proven, it is desirable to identify arrangements which allow for implementation of a MIMO relay network, that is where a source node, a relay node and a destination node all are equipped with multiple antennas.

DETAILED DESCRIPTION

An embodiment described herein provides a method of transmitting a signal from a multi-antenna source node, via a multi-antenna relay node, to a multi-antenna destination node, the method comprising applying an encoding at the source node, and applying a precoding at the relay node, the encoding and precoding being heterogeneous, and the encoding and precoding being, in combination, a quasi-orthogonal space time block coding.

One of the encoding and the precoding may comprise a first space time coding which is quasi-orthogonal. The other of the encoding and the precoding may comprise a second space time coding which is a delay-and-forward coding. The second space time coding may comprise a group cyclic delay code.

The source node may comprise two antennas, wherein the encoding applied at the source node comprises an Alamouti encoding, and the precoding at the relay node comprises a group cyclic delay code.

The source node may comprise more than two antennas, wherein the encoding applied at the source node comprises a quasi-orthogonal space time block code and the precoding applied at the relay node comprises a group cyclic delay code. The encoder may comprise a block diagonal matrix relationship between unencoded information and encoded information, the block diagonal matrix relationship being constructed from a series of instances of a first square matrix and a series of instances of a second square matrix. The second matrix may be the transpose of the first matrix. The block diagonal matrix relationship may be defined such that it applies a different coding at each antenna. The first square matrix and the second square matrix may each define cyclic delay codes.

Another embodiment described herein provides a communications network comprising a multi-antenna source node, a multi-antenna relay node, and a multi-antenna destination node, the source node being operable to transmit a signal via the relay node to the destination node, the source node comprising an encoder for applying an encoding to the signal, and the relay node comprising a precoder for applying a precoding at the relay node, the encoding and precoding being heterogeneous, and the net effect of the encoding and precoding being to apply a quasi-orthogonal space time block coding to the signal.

Figure 1:
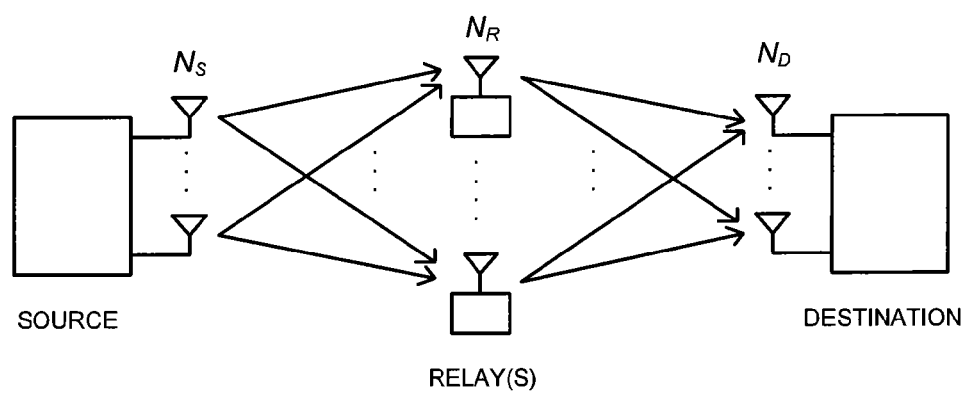
FIG. 1 illustrates a customary dual-hop communications network in the field of the disclosure.

By way of background to the following description, FIG. 1 illustrates a dual-hop $N_S \times N_R \times N_D$ MIMO relay network, where $N_S$, $N_R$ and $N_D$ denote the number of source, relay and destination antennas. It will be appreciated that, as noted below in more depth, a dual-hop arrangement is but one of the arrangements contemplated and disclosed herein. A dual-hop arrangement is illustrated here for reasons of simplicity.

It is desirable, in introducing relaying into a network, to maintain any existing characteristics of low cost, low complexity and low power consumption. At least, the technical cost of introducing relaying should not outweigh the benefit of doing so.

In this context, a fixed gain amplify-and-forward (AF) relaying scheme is appropriate. It will be noted by the reader that FIG. 1 depicts $N_R$ single-antenna relays instead of a single relay node with $N_R$ co-located antennas. This depiction can be provided because, in the described embodiment, joint signal processing between relay antennas is not required. Therefore, as will be appreciated by the reader, in light of this, there is no operational difference between described embodiments employing $N_R$ spatially distributed single-antenna relays and an embodiment employing a single relay node with $N_R$ co-located antennas.

Two existing relaying techniques for dual-hop $N_S \times N_R \times N_D$ MIMO-STBC AF relay networks and one existing distributed cyclic delay diversity (CDD) technique for dual-hop $1 \times N_R \times 1$ AF relay networks will now be summarised.

Figure 2A:
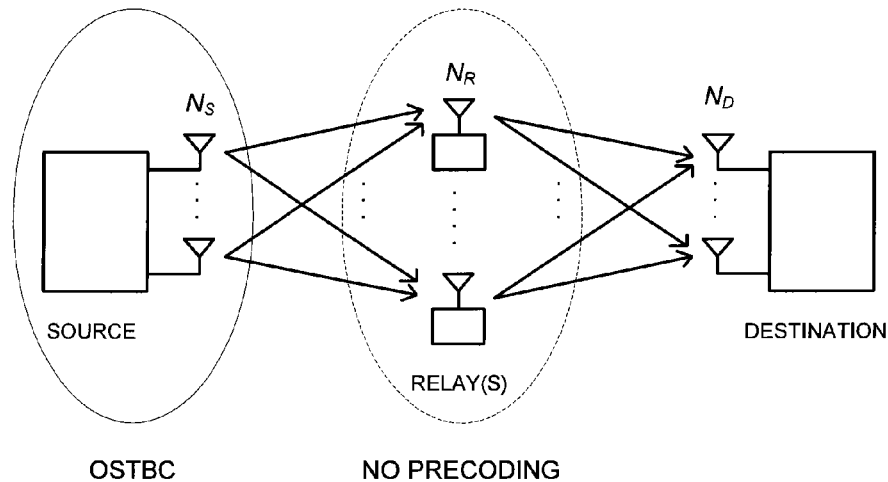
FIG. 2a illustrates the network of FIG. 1 configured for OSTBC encoding at the source.

For an independent signal processing of the received signal at each relay antenna in a dual-hop MIMO-STBC AF relay network, the simplest straight-AF scheme uses orthogonal space time block coding (OSTBC) encoding at the source and no precoding at the relays. FIG. 2(a) illustrates the straight-AF scheme, wherein each relay antenna simply amplifies and forwards its received signal with a fixed gain.

Figure 2B:
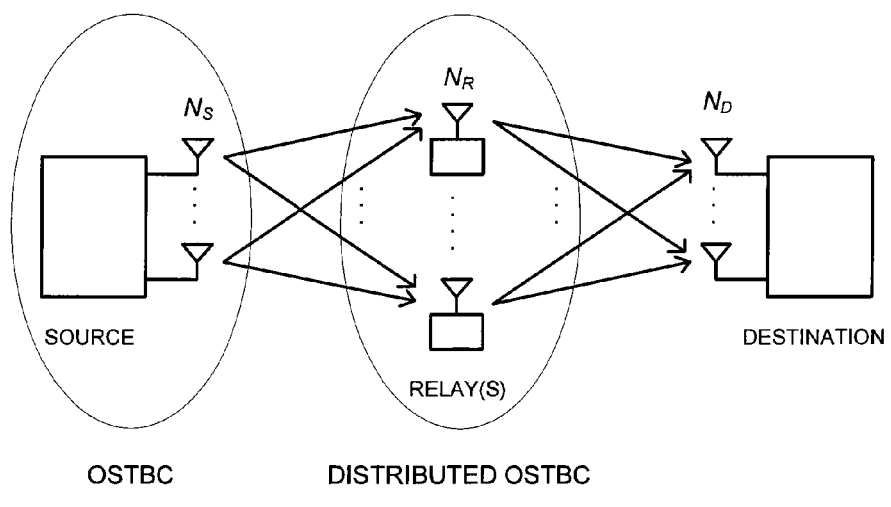
FIG. 2b illustrates the network of FIG. 1 configured for homogeneous OSTBC encoding at the source and distributed OSTBC precoding at the relay.

FIG. 2(b) shows another relaying scheme for dual-hop MIMO-STBC AF relay networks, known as the cascaded-OSTBC scheme. In the cascaded-OSTBC scheme, OSTBC encoding is performed at the source and distributed OSTBC precoding is performed at the relays. The OSTBC at the source and the distributed OSTBC at the relays are homogeneous. Moreover, the OSTBC encoding scheme at the source and the distributed OSTBC precoding scheme at the relays need to be designed jointly in order to construct a specific OSTBC in a cascaded and distributed manner.

A distributed CDD scheme can be employed in a dual-hop $1 \times N_R \times 1$ AF relay network, where each relay amplifies and forwards a random cyclic delay version of its received signal. As seen by the destination node, this creates an artificial time-dispersive channel (or frequency-selective fading channel). Using this distributed CDD scheme improves diversity gain at the cost of increasing the frequency-selectivity of the equivalent channel (which results in an artificial ISI). Hence, a linear frequency domain equalizer (FDE) is used to combat the frequency-selective channel distortion and to extract the diversity gain. Note that alternative equalizers can be used in place of the linear FDE, such as decision feedback equalizers and linear time domain equalizers.

In the straight-AF approach, since no precoding is performed at the relay, the transmit signal from a source antenna passes through all relay antennas and is added up at each destination antenna in a non-orthogonal manner. This leads to a loss in diversity and/or coding gain.

In the cascaded-OSTBC scheme described above with reference to FIG. 2(b), the encoder at the source and the distributed precoder at the relays are homogeneous OSTBC. This means that the encoder and distributed precoder have to be designed jointly in order to construct a specific OSTBC in a cascaded and distributed manner. However, if an arrangement is presented which comprises an OSTBC encoder at the source and a distributed OSTBC precoder to form a full-rate, full-diversity 4×4 real OSTBC as the cascaded OSTBC scheme for a $2 \times 2 \times N_D$ MIMO AF relay network, as the number of source and relay antennas increases, it is not always possible to construct a complex cascaded-STBC in a cascaded and distributed manner using the existing complex STBCs that are originally designed for point-to-point MIMO systems. For example, it is not possible to construct a ½-rate, full-diversity 8×16 complex OSTBC in a cascaded and distributed manner when $N_S=2$ and $N_R=3$.

Hence there are few practical examples of the cascaded-OSTBC scheme, which means that the cascaded-OSTBC scheme cannot be extended to a generalized dual-hop MIMO AF relay network with arbitrary numbers of source and relay antennas.

Embodiments presented herein use a generalized quasi-orthogonal space-time relaying code (QSTRC) design, where the encoder at the source and the precoder at the relays can be heterogeneous (i.e. two different types of space-time codes).

Embodiments described herein set forth a heterogeneous encoder (at the source) and a distributed precoder (at the relay). As long as the encoder and distributed precoder design can be generalized, cascading a heterogeneous encoder and a distributed precoder leads to a new class of flexible (rather than specific) complex QSTRC that can also be generalized in a dual-hop MIMO-STBC AF relay network with arbitrary $N_S$ and $N_R$. An embodiment described herein provides a practical example of QSTRC design—namely a delay-and-forward (DLF) scheme, where the source uses OSTBC as its encoder and the relays use group cyclic delay codes (CDC) as distributed precoders (which will be referred to below as the DLF-I scheme). In another embodiment, the group CDC can be used at the source and distributed OSTBC can be used at the relays, which will be referred to as the DLF-II scheme.

The distributed CDD scheme described above is employed in a specific $1 \times N_R \times 1$ dual-hop MIMO relay network. In this distributed scheme, a block-based CDC with a random cyclic delay is used as a precoder matrix at each relay to achieve cooperative diversity gain via creating an artificial frequency selective fading channel seen by the destination. The destination then uses a linear FDE to recover the data symbols. Although such a distributed CDD scheme can benefit from a performance gain due to diversity improvement, it can also suffer from a performance loss due to the residual-ISI resulted from non-ideal equalization.

Embodiments described herein therefore present a sub-block based CDC as the distributed precoder matrix, wherein each sub-block may have different cyclic delays for the same relay. The purpose of using such a distributed precoder matrix at the relays is to construct a new class of flexible QSTRC seen by the destination, and the destination can then use maximum-likelihood detection (MLD) to decode the data symbols. Moreover, the DLF technique described below improves the coding gain while yielding an excellent diversity gain.

An embodiment provides a method of designing generalized quasi-orthogonal space-time relaying codes (QSTRC) for dual-hop $N \times M \times N_D$ MIMO-STBC AF relay networks that can be generalized to arbitrary numbers of source, relay and destination antennas (denoted as N, M and $N_D$ respectively).

The encoder design at the source and the distributed precoder design at the relays may be heterogeneous in the sense that the encoding scheme at the source and the precoding scheme at the relays may use two different types of codes.

The encoder at the source may be orthogonal or quasi-orthogonal space-time block codes (OSTBC) $x_j$ (j=1, ..., N) and the precoder at the relay may be a block diagonal matrix given by $$P_i = blkdiag\{\underbrace{A_i, \ldots, A_i}_{K \text{ matrices}}, \underbrace{B_i, \ldots, B_i}_{K \text{ matrices}}\} \text{ for } i = 1, \ldots, M$$

where $K \geq N/2$, and the sub-matrices $A_i$ and $B_i$ are both M×M square matrices.

In another embodiment, the precoders at the relays may be distributed orthogonal or quasi-orthogonal space-time block codes $x_j$ (j=1, ..., M) and the encoder at the source antennas may be a block diagonal matrix given by $$P_i = blkdiag\{\underbrace{A_i, \ldots, A_i}_{K \text{ matrices}}, \underbrace{B_i, \ldots, B_i}_{K \text{ matrices}}\}$$

where $K \geq M/2$, and the sub-matrices $A_i$ and $B_i$ are both N×N square matrices.

In any of the preceding described embodiments, the sub-matrix $A_i$ may be the transpose of $B_i$ and vice versa, i.e.

$A_i = B_i^T$ and $B_i = A_i^T$.

$A_1$ and $B_1$ may both be identity matrices, i.e. $A_1 = B_1 = I$ and $A_i$ for all i are mutually commutative matrices and so are $B_i$, i.e.

$A_i^H A_m = A_m A_i^H$ and $B_i^H B_m = B_m B_i^H$ where i,m=1, ..., M when $P_i$ is used at the relays, and i,m=1, ..., N when $P_i$ is used at the source.

$P_i$ may be different at each relay or source antenna, i.e.

$A_i \neq A_m$ ($B_i \neq B_m$) for i≠m.

The sub-matrices $A_i$ and $B_i$ may be cyclic delay codes given by $A_i = J^i$ and $B_i = J^{-i}$ where $J^i$ ($J^{-i}$) is a square circulant matrix obtained by cyclically shifting an identity matrix I down (up) by i elements.

The application of QSTRC design may be extended to three-hop $1 \times N \times M \times N_D$ MIMO-STBC AF relay networks.

The application of QSTRC design may be extended to dual-hop MIMO-STBC AF relay networks using two-way relaying communications.

The application of QSTRC design may be employed in conventional single-hop MIMO-STBC systems.

Figure 3A:
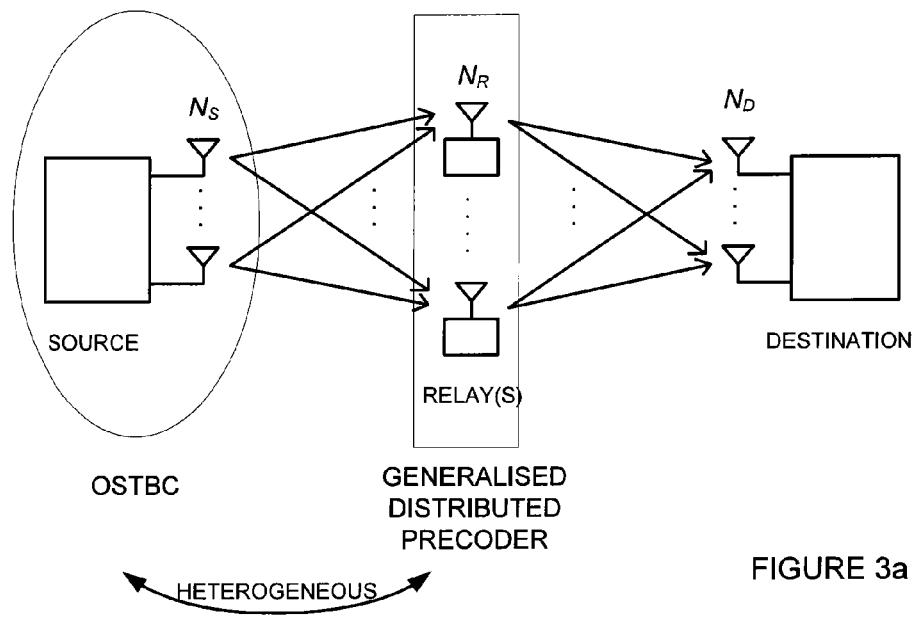
FIG. 3a illustrates the network of FIG. 1 configured, in accordance with a first embodiment, for heterogeneous encoding and precoding at the source and relay respectively.
Figure 3B:
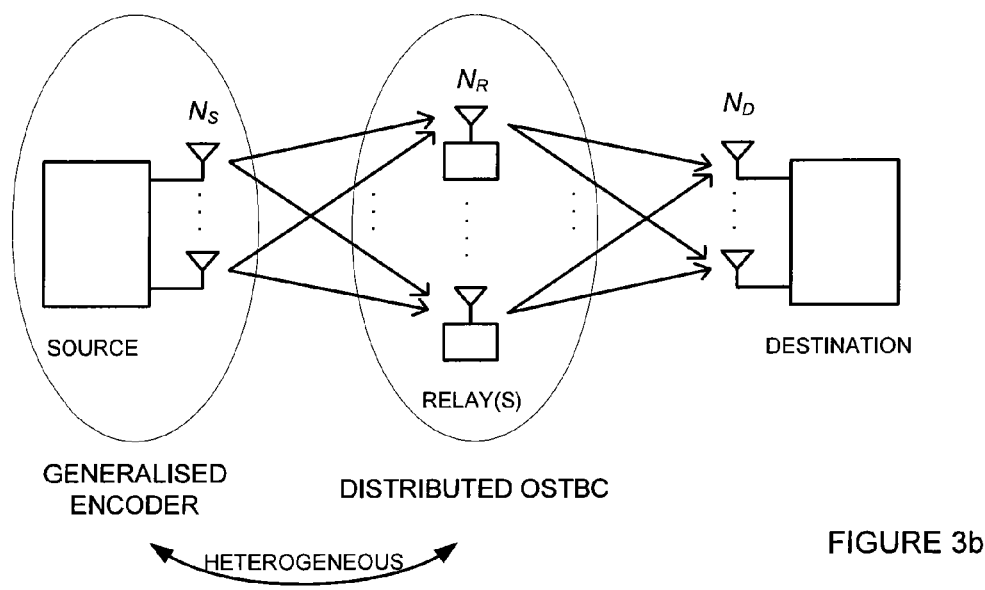
FIG. 3b illustrates the network of FIG. 1 configured, in accordance with a first embodiment, for heterogeneous encoding and precoding at the source and relay respectively.

In accordance with an embodiment, generalized precode-and-forward (GPF) schemes for dual-hop MIMO-STBC AF relay networks are illustrated in FIG. 3(a) and FIG. 3(b). FIG. 3(a) shows a GPF-I scheme. In the GPF-I scheme, an OSTBC encoder at the source and a generalized distributed precoder (which can be orthogonal or non-orthogonal) at the relays are heterogeneous codes such that a flexible QSTBC (seen at the destination) can be constructed in a cascaded and distributed manner. Therefore, the GPF scheme is well-suited for a dual-hop MIMO-STBC AF relay networks and can be extended to an arbitrary number of source and relay antennas. FIG. 3(b) shows a GPF-II scheme with a generalized encoder at the source and distributed OSTBC precoder at the relays. The reader will appreciate that the GPF-II scheme can be derived from the GPF-I scheme using the same concept of heterogeneous source encoder design and relay precoder design. Hence, the remainder of this disclosure focuses on providing a description of the GPF-I scheme.

1. GPF Scheme

Figure 4:
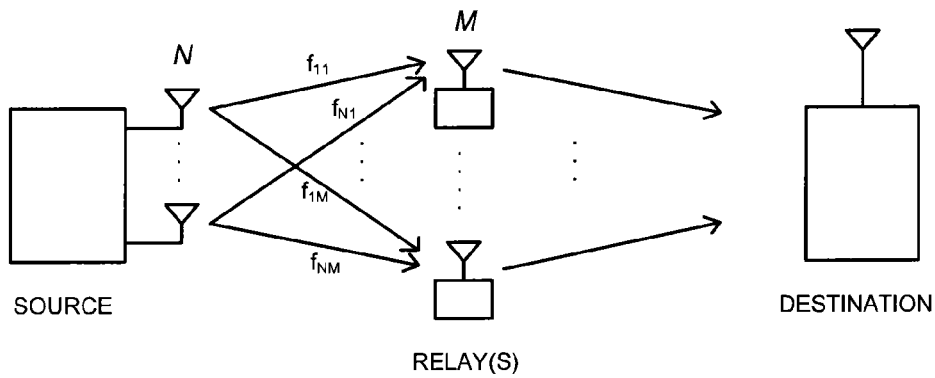
FIG. 4 illustrates an implementation of the first embodiment, with a single antenna destination node.

FIG. 4 shows a system model of a dual-hop $N \times M \times 1$ MIMO-STBC AF relay network, where the number of source, relay and destination antennas are $N_S = N$, $N_R = M$ and $N_D = 1$ respectively. When there is more than one destination antenna, maximum-ratio combining and maximum likelihood decoding or a suitable alternative decoding operation can be used at the destination to decode the data symbols and $N_D$ does not affect the encoder design at the source and the distributed precoder at the relays. Hence $N_D = 1$ is assumed here for convenience.

For the GPF scheme in FIG. 4, the j-th (j=1, ..., N) source antenna transmits its orthogonal space-time coded signal $x_j$, which is the j-th column of an OSTBC matrix, i.e. $X = [x_1, \ldots, x_N]$.

When there are two source antennas (N=2) and a full-rate Alamouti OSTBC is employed at the source, $$x_1 = \begin{bmatrix} s_1 \\ -s_2^* \end{bmatrix} \text{ and } x_2 = \begin{bmatrix} s_2 \\ s_1^* \end{bmatrix}$$

where $s_1$ and $s_2$ are both M-tuples given by $s_1 = [s_1, \ldots, s_M]^T$ and $s_2 = [s_{M+1}, \ldots, s_{2M}]^T$.

When there are more than two source antennas (N>2), a generalized ½-rate complex OSTBC can be employed at the source. Hence an OSTBC matrix used at the N-antenna source is a $2K \times N$ matrix ($K \geq N$) and it can be expressed as $$X = [x_1, \ldots, x_N] = \begin{bmatrix} s_1 & \cdots & s_N \\ \vdots & \ddots & \vdots \\ s_K & \cdots & s_{K-N+1} \\ s_1^* & \cdots & s_N^* \\ \vdots & \ddots & \vdots \\ s_K^* & \cdots & s_{K-N+1}^* \end{bmatrix} \quad (1)$$

where each $s_k$ (k=1, ..., K) is a M-tuple given by $s_k = \pm[s_{(k-1)M+1}, \ldots, s_{kM}]^T$.

As shown in FIG. 4, the channel from the j-th (j=1, ..., N) source antenna to the i-th (i=1, ..., M) relay antenna on the first hop is denoted as $f_{ji}$. Hence the received signal at the i-th (i=1, ..., M) relay antenna is $$r_i = \sum_{j=1}^{N} f_{ji} x_j + n_i$$

where $n_i$ is the received noise vector at the i-th relay.

$P_i$ denotes a generalized distributed precoder matrix used at the at the i-th relay and $\alpha$ denotes a fixed or variable amplification gain; the transmit signal at the i-th relay is $$t_i = \alpha P_i r_i = \alpha \sum_{j=1}^{N} f_{ji} \underbrace{P_i x_j}_{c_{(i-1)N+j}} + \alpha P_i n_i$$

where $c_{(i-1)N+j} = P_i x_j$ leads to the (i−1)N+j-th column of a new space-time relaying code matrix C seen by the destination. Since each of the M relays precodes N orthogonal STBC signals from the source (i.e. $x_1, \ldots, x_N$) with its precoder matrix $P_i$, the new space-time relaying code matrix C has NM columns, i.e.

$$C = [c_1, \ldots, c_N, \ldots, c_{(N-1)M+1}, \ldots, c_{NM}] \quad (2)$$
$$= [P_1 x_1, \ldots, P_1 x_N, \ldots, P_M x_1, \ldots, P_M x_N].$$

As shown in FIG. 4, the channel from the i-th (i=1, ..., M) source antenna to the destination on the second hop is denoted $g_i$. If $n_d$ denotes the received noise vector at the destination, the received signal at the destination is $$y = \sum_{i=1}^{M} g_i t_i + n_d \quad (3)$$

$$= \sum_{i=1}^{M} \sum_{j=1}^{N} \alpha \underbrace{f_{ji} g_i}_{h_{(i-1)N+j}} \underbrace{P_i x_j}_{c_{(i-1)N+j}} + \sum_{i=1}^{M} \alpha g_i P_i n_i + n_d$$

where $h_{(i-1)N+j} = \alpha f_{ji} g_i$ denotes the (i−1)N+j-th AF relay channel experienced by the (i−1)N+j-th column $c_{(i-1)N+j}$ of the space-time relaying code matrix C. Hence the received signal at the destination in (3) can be rewritten as $$y = \underbrace{[c_1, \ldots, c_{NM}]}_{c} \underbrace{\begin{bmatrix} h_1 \\ \vdots \\ h_{NM} \end{bmatrix}}_{h} + \alpha \underbrace{[P_1 n_1, \ldots, P_M n_M]}_{N} \underbrace{\begin{bmatrix} g_1 \\ \vdots \\ g_M \end{bmatrix}}_{g} + n_d \quad (4)$$

$$= Ch + \underbrace{\alpha Ng + n_d}_{v}$$

where $h = [h_1, \ldots, h_{NM}]$ is the AF relay channel vector seen by the destination and $v = \alpha Ng + n_d$ is the overall received noise vector at the destination.

In equation (4), given the knowledge of the AF relay channel h, the destination can decode the data symbols transmitted from the source using the corresponding STBC decoder for the space-time relaying code matrix C. For example, when C is an OSTBC, a simple linear combining STBC decoder can be used at the destination. When C is a QSTBC, maximum-likelihood detection (MLD) can be used as the STBC decoder at the destination.

Quasi-Orthogonal Space-Time Relaying Code Based on the GPF System Model

In the described embodiment, in order to provide a full NM-column space-time relaying code (STRC) matrix C and to remove the constraint of constructing an orthogonal STRC (as mentioned previously, it is not always possible to generalize the cascaded-OSTBC scheme with arbitrary N and M), a flexible quasi-orthogonal STRC (QSTRC) design is employed for dual-hop MIMO-STBC AF relay networks.

This embodiment employs a heterogeneous encoder design $x_j$ and distributed precoder design $P_i$ in the sense that $x_j$ and $P_i$ can be two different types of (space-time) codes. The advantage of heterogeneous design of $x_j$ and $P_i$ is that it is simple to generalize the resultant STRC matrix C with arbitrary N and M, as long as the two (space-time) codes $x_j$ and $P_i$ can be generalized to the case of arbitrary N and M. Moreover, in order to provide full NM-column STRC matrix C, C is designed as a QSTBC that satisfies the constraint described as follows.

The j-th sub-matrix of C is denoted $\overline{C}_j = [c_j, c_{N+j}, \ldots, c_{(M-1)N+j}] = [P_1 x_j, P_2 x_j, \ldots, P_M x_j]$ where $\overline{C}_j$ consists of M STRC signals from the j-th source antenna ($x_j$) passing through M relay precoders ($P_1, \ldots, P_M$) to the destination. Assuming an OSTBC encoder is used at the source, the problem is formulated as Given $x_j$ for all j (j=1, . . . , N) are mutually orthogonal columns, the aim is to design $P_i$ for all i (i=1, . . . , M) such that each column of $\overline{C}_j$ is orthogonal to each column of $\overline{C}_{l \neq j}$ for all l and j (i.e. $\overline{C}_l^H \overline{C}_j = 0$ for l≠j) and the columns within each $\overline{C}_j$ can be non-orthogonal, so $\overline{C}_j^H \overline{C}_j$ may have non-zero off-diagonal elements (i.e. $\overline{C}_j^H \overline{C}_j \neq I$).

2. Design Criteria for Distributed Precoder

As described in Section 1, in the 2×M×$N_D$ case (N=2), the source can transmit Alamouti OSTBC signals, i.e.

$$x_1 = \begin{bmatrix} s_1 \\ -s_2^* \end{bmatrix} \text{ and } x_2 = \begin{bmatrix} s_2 \\ s_1^* \end{bmatrix}$$

where $s_1 = [s_1, \ldots, s_M]^T$ and $s_2 = [s_{M+1}, \ldots, s_{2M}]^T$ are both M-tuples. When there are more than two source antennas (N>2), the source can transmit OSTBC signals using a generalized ½-rate complex OSTBC matrix given in (1), where $s_k = \pm[s_{(k-1)M+1}, \ldots, s_{kM}]^T$ for all k are also M-tuples.

To satisfy the QSTRC design criteria in the problem formulation, the derivation results show that the distributed precoder $P_i$ should be a block diagonal matrix given by $$P_i = blkdiag\{A_i, B_i\} \text{ for } N = 2$$

$$P_i = blkdiag\{\underbrace{A_i, \ldots, A_i}_{K \text{ matrices}}, \underbrace{B_i, \ldots, B_i}_{K \text{ matrices}}\} \text{ for } N > 2 \quad (5)$$

where $A_i$ and $B_i$ are both M×M matrices. Let $A_1 = B_1 = I$, $A_i$ has to be the transpose of $B_i$ (vice versa) and $A_i$ ($B_i$) for all i have to be mutually commutative, i.e.

$A_i = B_i^T$ $A_i^H A_m = A_m A_i^H$ for all i,m (i,m=1, . . . ,M)

$(B_i^H B_m = B_m B_i^H)$ \quad (6)

Moreover, the following criterion also needs to be satisfied to provide full NM-column STRC matrix C, i.e.

$A_i \neq A_m$ ($B_i \neq B_m$) for i≠m. \quad (7)

Performance of the proposed DLF scheme in dual-hop 2×3×1 and 2×3×2 MIMO-STBC AF relay networks is presented in this section. The relaying schemes considered in the simulation are listed in table 1.

TABLE 1

| Relaying scheme | Encoder at the source | Precoder at the relays | Modulation |
|---|---|---|---|
| Straight-AF | Alamouti OSTBC | No precoding | QPSK |
| DLF-I | Alamouti OSTBC | Group cyclic delay code | QPSK |
| DSTBC | No precoding | ½-rate distributed OSTBC | 16QAM |
| DLF-II | Group cyclic delay code | ½-rate distributed OSTBC | 16QAM |

In table 1, the straight-AF and DLF-I schemes lead to a full-rate STRC as seen by the destination while the DSTBC and DLF-II schemes lead to a ½-rate STRC as seen by the destination. Hence 16 QAM is used in the DSTBC and DLF-II schemes to maintain the same bit rate transmission as the straight-AF and DLF-II schemes. Note that ½-rate 8×16 complex OSTBC cannot be constructed in a cascaded and distributed manner when N=2 and M=3. Hence the cascaded-OSTBC scheme is not applicable in the 2×3×$N_D$ case.

Figure 5:
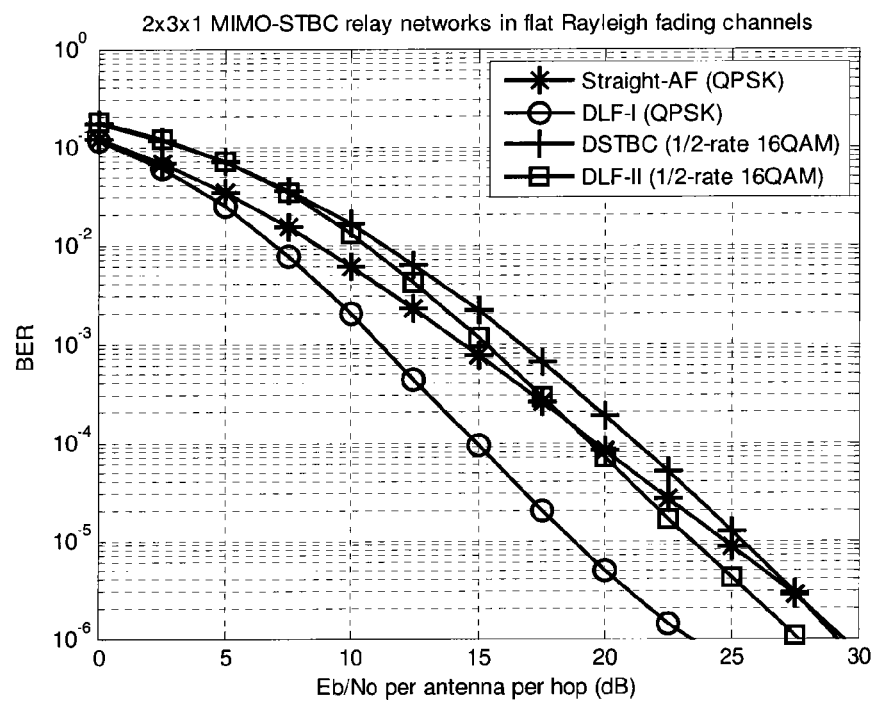
FIG. 5 illustrates a graph of bit-error rates for comparative examples of implementations of the configurations shown in FIGS. 2a, 2b, 3a and 3b.

FIG. 5 shows a graph of BER performance of the described DLF schemes in a dual-hop 2×3×1 MIMO-STBC AF relay network. It can be seen that the DLF-I scheme provides a 5 dB of performance gain over the existing straight-AF scheme at a BER of 0.0001. Moreover, the DLF-II scheme also provides a 2 dB of performance gain over the DSTBC scheme at a BER of 0.0001.

Figure 6:
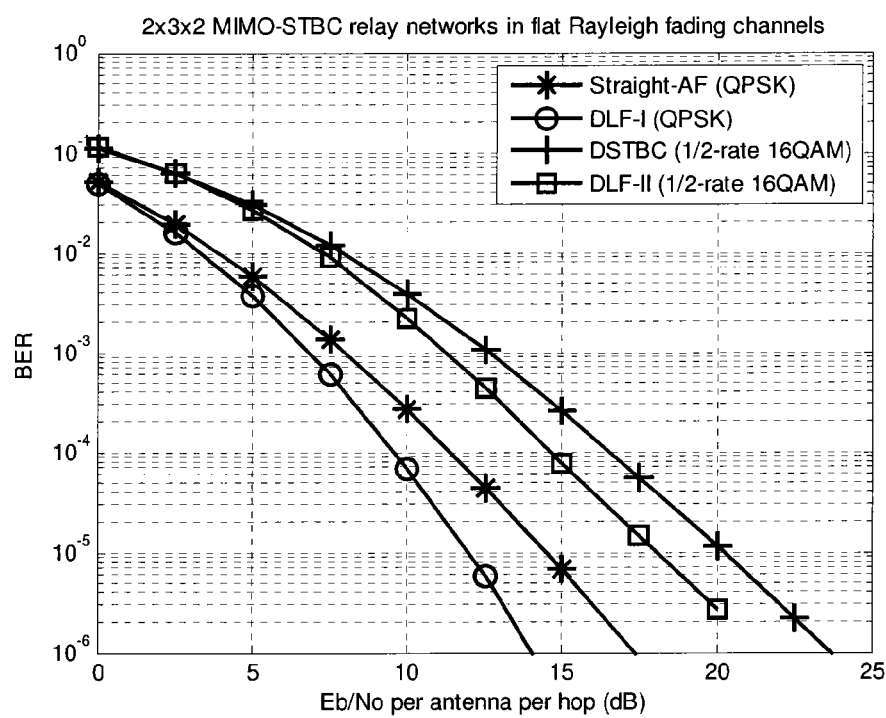
FIG. 6 illustrates a graph of bit-error rates for comparative examples of further implementations of the configurations shown in FIGS. 2a, 2b, 3a and 3b.

FIG. 6 shows a graph of BER performance of the described DLF schemes in a dual-hop 2×3×2 MIMO-STBC AF relay network. It can be seen that the DLF-I scheme provides a 2 dB of performance gain over the existing straight-AF scheme at a BER of 0.0001. Moreover, the DLF-II scheme also provides a 2 dB of performance gain over the DSTBC scheme at a BER of 0.0001.

Both FIGS. 5 and 6 show that the described DLF schemes, based on the proposed QSTRC design, are able to provide a significant performance gain (ranging from 2 dB to 5 dB) over the existing schemes. Apart from the significant performance gain over the existing schemes, certain embodiments of the DLF scheme described herein also has the following advantages:

The QSTRC design (including the proposed DLF scheme) can be generalized in dual-hop N×M×$N_D$ MIMO-STBC AF relay networks with arbitrary N and M;

The GPF scheme can be employed in three-hop 1×N×M× $N_D$ MIMO-STBC AF relay networks;

The QSTRC scheme can be employed in dual-hop MIMO-STBC AF relay networks with two-way communications; and The QSTRC design can be employed in conventional single-hop MIMO-STBC systems.

A practical example will now be described of a distributed precoder design, employing a Delay-and-Forward (DLF) scheme in accordance with the arrangement set out above.

This DLF scheme can be generalized for arbitrary N and M. It is referred to here as the DLF scheme because the group cyclic delay codes (CDC) are used as the distributed precoders at the relays. In the DLF scheme, obtaining a distributed precoder design $P_i$ which satisfies equations (5)-(7) is achieved by designing $A_i$ and $B_i$ as $$A_1 = B_1 = I_M$$

$$A_i = J_M^i$$

$$B_i = A_i^T = J_M^{-i} \quad (8)$$

where $J_M^i$ ($J_M^{-i}$) is a M×M circulant matrix obtained by cyclically shifting $I_M$ down (up) by i element(s). Since circulant matrices commute, the criteria in equation (6) are satisfied. It will be understood by a person skilled in the art that if $A_i$ is circulant for all i, the criteria in equation (6) will be satisfied; thus embodiments are not limited to the designs given in equation (8).

For example, when N=2 and M=3, the source transmits two OSTBC signals, i.e.

$$x_1 = \begin{bmatrix} s_1 \\ -s_2^* \end{bmatrix} \text{ and } x_2 = \begin{bmatrix} s_2 \\ s_1^* \end{bmatrix},$$

where $s_1 = [s_1, s_2, s_3]^T$ and $s_2 = [s_4, s_5, s_6]^T$. Using the DLF scheme in equation (8), the precoder matrices at the relays are $$P_1 = I_2, P_1 = \begin{bmatrix} J_2^1 & 0 \\ 0 & J_3^2 \end{bmatrix} \text{ and } P_i = \begin{bmatrix} J_3^2 & 0 \\ 0 & J_2^1 \end{bmatrix}.$$

Hence the resultant QSTRC matrix is $$C = [c_1 \ c_2 \ c_3 \ c_4 \ c_5 \ c_6] = \begin{bmatrix} s_1 & s_4 & s_3 & s_6 & s_2 & s_5 \\ s_2 & s_5 & s_1 & s_4 & s_3 & s_6 \\ s_3 & s_6 & s_2 & s_5 & s_1 & s_4 \\ -s_4^* & -s_1^* & -s_5^* & -s_2^* & -s_6^* & -s_3^* \\ -s_5^* & -s_2^* & -s_6^* & -s_3^* & -s_4^* & -s_1^* \\ -s_6^* & -s_3^* & -s_4^* & -s_1^* & -s_5^* & -s_2^* \end{bmatrix} \quad (9)$$

From (9) the reader will note that each column of $[c_1 \ c_3 \ c_5]$ is orthogonal to each column of $[c_2 \ c_4 \ c_6]$, but the columns within $[c_1 \ c_3 \ c_5]$ are not mutually orthogonal, nor are those within $[c_2 \ c_4 \ c_6]$. At the destination, MLD can be used to decode the data symbol.

Figure 7:
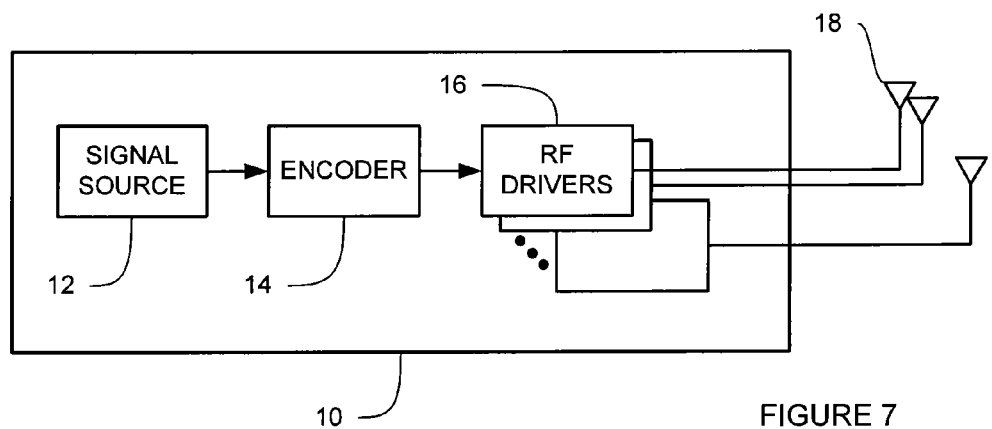
FIG. 7 illustrates a schematic architecture of a source node of the configurations shown in FIG. 3a or 3b.
Figure 8:
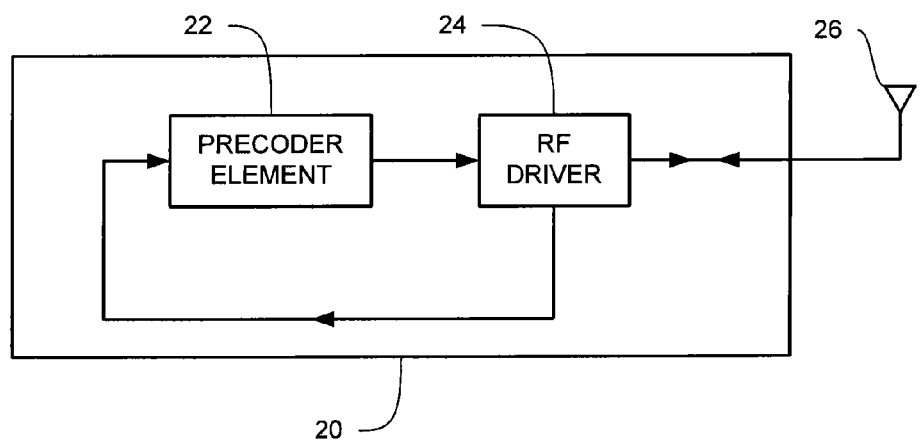
FIG. 8 illustrates a schematic architecture of a relay node of the configurations shown in FIG. 3a or 3b.

FIGS. 7 and 8 look to provide the reader with an appreciation of the manner in which the above embodiments can be implemented in practice.

FIG. 7 shows a communications node configured as a signal source node 10, having a signal source 12 forwarding a signal for transmission to an encoder 14 and then on to a plurality of RF drivers 16 each configured to generate an RF wireless emission at a respective one of a plurality of antennas 18.

It will be appreciated that the signal source 12 can be implemented as a variety of different means. Particular examples include audio/video signal generators, computer applications.

Also, it will be appreciated that, in practice, other intermediary signal processing stages may be provided, but these are omitted for reasons of clarity.

Similar provision is made in a relay node 20 as illustrated in FIG. 8. In this configuration, the relay node 20 comprises a precoder element 22 which makes up, alongside other precoder elements of other relay nodes, a precoder as described above. The precoder element 22 is operable on a signal received at an antenna 26, detected by an RF driver 24, and passes the precoded signal back through the RF driver for emission at the antenna 26.

The encoder 14 and the precoder element 22 may be implemented, in practice, by hardware specific for the purpose, or may be implemented on general purpose hardware configured by software and/or firmware. If the latter arrangement is employed, software may be introduced either as a complete software product, i.e. a self contained executable computer program embodied on a carrier, or as an add-on or plug-in to supplement existing functionality pre-existing on the hardware.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of transmitting a signal from a multi-antenna source node, via a multi-antenna relay node, to a multi-antenna destination node, the method comprising applying an encoding at the source node, and applying a precoding at the relay node, the encoding and precoding being heterogeneous, and the encoding and precoding being, in combination, a quasi-orthogonal space time block coding, wherein one of the encoding and the precoding comprises a first space time coding which is quasi-orthogonal.

2. A method in accordance with claim 1 wherein the other of the encoding and the precoding comprises a second space time coding which is a delay-and-forward coding.

3. A method in accordance with claim 2 wherein the second space time coding comprises a group cyclic delay code.

4. A method of transmitting a signal from a multi-antenna source node, via a multi-antenna relay node, to a multi-antenna destination node, the method comprising applying an encoding at the source node, and applying a precoding at the relay node, the encoding and precoding being heterogeneous, and the encoding and precoding being, in combination, a quasi-orthogonal space time block coding, wherein the source node comprises two antennas, the encoding applied at the source node comprises an Alamouti encoding, and the precoding at the relay node comprises a group cyclic delay code.

5. A method of transmitting a signal from a multi-antenna source node, via a multi-antenna relay node, to a multi-antenna destination node, the method comprising applying an encoding at the source node, and applying a precoding at the relay node, the encoding and precoding being heterogeneous, and the encoding and precoding being, in combination, a quasi-orthogonal space time block coding, wherein the source node comprises more than two antennas, the encoding applied at the source node comprises a quasi-orthogonal space time block code and the precoding applied at the relay node comprises a group cyclic delay code.

6. A method in accordance with claim 5 wherein the encoding comprises transforming a first part of an unencoded signal by a first transform and a second part of the unencoded signal by a second transform.

7. A method in accordance with claim 6 wherein the second transform is related to the first transform by way of symmetry.

8. A method in accordance with claim 6, wherein the first and second transforms are related such that they apply a different coding at each antenna.

9. A method in accordance with claim 6 wherein the first transform and the second transform each define cyclic delay codes.

10. A communications network comprising a multi-antenna source node, a multi-antenna relay node, and a multi-antenna destination node, the source node being operable to transmit a signal via the relay node to the destination node, the source node comprising an encoder for applying an encoding to the signal, and the relay node comprising a precoder for applying a precoding at the relay node, the encoding and precoding being heterogeneous, and the net effect of the encoding and precoding being to apply a quasi-orthogonal space time block coding to the signal, wherein one of the encoding and the precoding comprises a first space time coding which is quasi-orthogonal.

11. A network in accordance with claim 10 wherein the other of the encoding and the precoding comprises a second space time coding which is a delay-and-forward coding.

12. A network in accordance with claim 11 wherein the second space time coding comprises a group cyclic delay code.

13. A communications network comprising a multi-antenna source node, a multi-antenna relay node, and a multi-antenna destination node, the source node being operable to transmit a signal via the relay node to the destination node, the source node comprising an encoder for applying an encoding to the signal, and the relay node comprising a precoder for applying a precoding at the relay node, the encoding and precoding being heterogeneous, and the net effect of the encoding and precoding being to apply a quasi-orthogonal space time block coding to the signal, wherein the source node comprises two antennas, the encoder being operable to apply an Alamouti encoding, and the precoder at the relay node being operable to apply a group cyclic delay code.

14. A communications network comprising a multi-antenna source node, a multi-antenna relay node, and a multi-antenna destination node, the source node being operable to transmit a signal via the relay node to the destination node, the source node comprising an encoder for applying an encoding to the signal, and the relay node comprising a precoder for applying a precoding at the relay node, the encoding and precoding being heterogeneous, and the net effect of the encoding and precoding being to apply a quasi-orthogonal space time block coding to the signal, wherein the source node comprises more than two antennas, the encoder being operable to apply a quasi-orthogonal space time block code and the precoder at the relay node being operable to apply a group cyclic delay code.

15. A network in accordance with claim 14 wherein the encoder is operable to transform a first part of an unencoded signal by a first transform and a second part of the unencoded signal by a second transform.

16. A network in accordance with claim 15 wherein the second transform is related to the first transform by way of symmetry.

17. A network in accordance with claim 15, wherein the first and second transforms are related such that they apply a different coding at each antenna.

18. A network in accordance with claim 15 wherein the first transform and the second transform each define cyclic delay codes.

* * * * *